(12) United States Patent
Swartz et al.

(10) Patent No.: US 10,209,847 B2
(45) Date of Patent: Feb. 19, 2019

(54) METADATA DRIVEN CUSTOMIZATION OF A COMPUTER APPLICATION

(71) Applicant: Microsoft Technology Licensing, LLC, Redmond, WA (US)

(72) Inventors: Tanya L. Swartz, Toronto (CA); Dmitry V. Zhiyanov, Woodinville, WA (US); Girish Premchandran, Redmond, WA (US); Gagan Chopra, Redmond, WA (US); Arif Kureshy, Sammamish, WA (US); Ahmad Mahdi El Husseini, Redmond, WA (US); Jayadev Pillai, Bellevue, WA (US); Misha H. St. Lorant, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 1315 days.

(21) Appl. No.: 14/188,191

(22) Filed: Feb. 24, 2014

(65) Prior Publication Data
US 2014/0173453 A1 Jun. 19, 2014

Related U.S. Application Data

(63) Continuation of application No. 12/984,686, filed on Jan. 5, 2011, now Pat. No. 8,700,677, which is a
(Continued)

(51) Int. Cl.
*G06F 17/30* (2006.01)
*G06F 3/048* (2013.01)

(52) U.S. Cl.
CPC ........ *G06F 3/048* (2013.01); *G06F 17/30286* (2013.01); *G06F 17/30905* (2013.01); *Y10S 707/912* (2013.01)

(58) Field of Classification Search
CPC ......... G06F 17/30905; G06F 17/30286; G06F 3/048
(Continued)

(56) References Cited

U.S. PATENT DOCUMENTS

| | | | |
|---|---|---|---|
| 6,704,733 B2 * | 3/2004 | Clark | G06F 21/10 705/26.1 |
| 7,085,752 B2 * | 8/2006 | Mortensen | G06F 8/71 707/669 |

(Continued)

FOREIGN PATENT DOCUMENTS

| | | |
|---|---|---|
| CN | 1480859 A | 3/2002 |
| EP | 1 387 272 A1 | 2/2004 |

(Continued)

OTHER PUBLICATIONS

Prosecution history from U.S. Appl. No. 10/867,496 including; Notice of Abandonment dated Sep. 14, 2009, Patent Board Decision dated Jun. 5, 2009, Reply Brief filed Jan. 14, 2008, Examiner's Answer to Appeal Brief dated Dec. 3, 2007, Appeal Brief filed Aug. 10, 2007, Notice of Appeal dated Jun. 12, 2007, Advisory Action dated Apr. 19, 2007, Advisory Action dated Apr. 10, 2007, Response filed Mar. 15, 2007, Final Rejection dated Jan. 18, 2007, Amendment filed Oct. 6, 2006, and Non-Final Rejection dated Jul. 6, 2006, 169 pages.

(Continued)

*Primary Examiner* — Shahid A Alam
(74) *Attorney, Agent, or Firm* — Christopher J. Volkmann; Kelly, Holt & Christenson, PLLC (57) ABSTRACT

A method of facilitating customization of a software-implemented business process includes storing, within a mobile computing device, a subscription list of entities. The subscription list is defined by subscription metadata. Customized data is received. The customized data corresponds to the entities identified in the subscription list. The received
(Continued)

customized metadata is stored on the mobile computing device.

20 Claims, 9 Drawing Sheets

Related U.S. Application Data continuation of application No. 10/760,099, filed on Jan. 16, 2004, now Pat. No. 7,890,544.

(58) Field of Classification Search
USPC .......................................... 707/803; 715/744
See application file for complete search history.

(56) References Cited

U.S. PATENT DOCUMENTS

| | | | |
|---|---|---|---|
| 7,403,956 | B2 | 7/2008 | Vaschillo et al. |
| 7,567,967 | B2 | 7/2009 | Chopra et al. |
| 7,890,544 | B2 | 2/2011 | Swartz et al. |
| 8,700,677 | B2 | 4/2014 | Swartz et al. |
| 2002/0054750 | A1 | 5/2002 | Ficco et al. |
| 2002/0152215 | A1* | 10/2002 | Clark ...................... G06F 21/10 707/770 |
| 2002/0194305 | A1 | 12/2002 | Sadeghi et al. |
| 2003/0079132 | A1 | 4/2003 | Bryant |
| 2003/0144873 | A1 | 7/2003 | Keshel |
| 2003/0147369 | A1 | 8/2003 | Singh et al. |
| 2003/0159136 | A1 | 8/2003 | Huang et al. |
| 2003/0208543 | A1 | 11/2003 | Enete et al. |
| 2004/0078464 | A1 | 4/2004 | Rajan et al. |
| 2004/0117358 | A1 | 6/2004 | Von Kaenel et al. |
| 2004/0168184 | A1 | 8/2004 | Steenkamp et al. |
| 2004/0177339 | A1* | 9/2004 | Plaisted ..................... G06F 8/20 717/116 |
| 2005/0160060 | A1 | 7/2005 | Swartz et al. |
| 2005/0165803 | A1 | 7/2005 | Chopra et al. |
| 2005/0177601 | A1 | 8/2005 | Chopra et al. |
| 2006/0259852 | A1* | 11/2006 | Upendran ......... G06F 17/30873 715/234 |

FOREIGN PATENT DOCUMENTS

| | | |
|---|---|---|
| JP | 11-196180 | 7/1999 |
| JP | 11-212793 | 8/1999 |
| JP | 2003-30084 | 1/2003 |
| JP | 2003-99168 | 4/2003 |
| JP | 2004-62425 | 2/2004 |
| WO | 2003102823 A1 | 12/2003 |

OTHER PUBLICATIONS

Prosecution History from U.S. Appl. No. 10/884,558 including: Issue Notification dated Jul. 8, 2009, Response to Notice to File Corrected Application Papers filed Jun. 16, 2009, Notice to File Corrected Application Papers mailed May 29, 2009 and Notice of Allowance dated Apr. 10, 2009, 16 Pages.
Prosecution history from U.S. Appl. No. 10/884,558 (continued) Advisory Action dated Jan. 28, 2009, Supplemental Response filed Jan. 27, 2009, Response After Final filed Jan. 14, 2009, Final Rejection dated Nov. 14, 2008, Amendment filed Aug. 14, 2008, Non-final Rejection dated May 14, 2008, Amendment and RCE filed Mar. 3, 2008, Advisory Action dated Jan. 25, 2008, Response filed Jan. 4, 2008, Final Rejection dated Oct. 3, 2007, Amendment filed Jul. 3, 2007, and Non-final Rejection dated Apr. 3, 2007. 170 pages.
Application and drawings from related U.S. Appl. No. 10/760,099. 45 pages.
Prosecution history from U.S. Appl. No. 10/760,099 including; Issue Notification dated Jan. 26, 2011, Notice of Allowance dated Oct. 5, 2010, Patent Board Decision mailed Jul. 29, 2010, Examiner's Answer dated Nov. 28, 2007, Appeal Brief filed Aug. 13, 2007, Notice of Appeal filed Jun. 13, 2007, Advisory Action dated May 22, 2007, Response filed Apr. 16, 2007, Final Rejection dated Mar. 26, 2007, Amendment filed Dec. 6, 2006, Non-Final Rejection dated Sep. 8, 2006, Preliminary Amendment filed May 24, 2004.115 p.
Application and drawings from related U.S. Appl. No. 12/984,686. 34 pages.
Prosecution history form related U.S. Appl. No. 12/984,686 including; Issue Notification dated Mar. 26, 2014, Notice of Allowance dated Dec. 6, 2013, Amendment filed Oct. 22, 2013, Non-Final Rejection dated Jun. 17, 2013, Amendment with RCE filed Jul. 30, 2012, Final Rejection dated May 23, 2012, Amendment filed Mar. 20, 2012, Non-Final Rejection dated Jan. 11, 2012, Response to Restriction Requirement filed Oct. 7, 2011, Restriction Requirement dated Sep. 8, 2011, Preliminary Amendment filed Apr. 11, 2011. 79 pages.
Notice of Allowance related Chinese patent appln. No. 200510065645. 4, dated Feb. 9, 2011, with English translation.
Fenkam, P., Kirda, E., Dustdar, S. Gall, H., Reif, G., "Evaluation of a Publish/Subscribe System for Collaborative and Mobile Working," IEEE International Workshops on Enabling Technologies Workshops—Infrastructure for collaborative enterprises, 2001, 11th, pp. 23-28.
Chyrsantis, P., Zadorozhny, V., "From Location Databases to Pervasive Catalog," International Workshop on Database and Expert Systems Applications, Database and Expert Systems Applications, 2002, vol. 13, pp. (2) 739-746.
Rasheed, A., Zaslaysky, A. "Twin-Transactions—Delayed Transactions Synchronization Model", Lecture Notes in Computer Science, Mobility and replication: Object-Oriented Technology, ECOOP '98 workshop reader, ECOOP '98 Workshops, demos, and posters 1988 Issue 1543, pp. 311-312.
Vassiliadis, B. et al.; "Enabling Content-centric Information Systems through Multi-Layer Architectures," Intelligent Systems and Controls, 267-271. Date Unknown.
Hsiao, I. et al.; DLFM: A Trasnactional Resource Manager, Sigmod Record Management of Data 2000, vol. 29, No. 2, pp. 518-528.
Official Search Report dated Jan. 2, 2006, of the European Patent Office for Foreign Appln. No. EP 05102220.
"Nero 5 Burning Rom Brief Instructions", Internet Publication XP-002356186, http://www.nero.com, Internet, Online 2001, pp. E1-E34.
"Syncml Sync Protocol, version 1.1," Syncml Sync Protocol, Feb. 15, 2002, pp. 1-62, XP002332895.
Microsoft CRM Product Architecture, White Paper, Published Apr. 2003, 36 pgs.
Official Action dated May 11, 2011 in related Korean patent application No. 10-2005-0023512, filed Mar. 22, 2005, No Translation Available, 6 pages.
First Official Action Notice of Rejection dated Mar. 28, 2008 in related Chinese patent application No. 200510065645.4, filed Mar. 22, 2015, with English translation, 10 pages.
Notice of Rejection dated Dec. 10, 2010 in related Japanese patent application No. 2005-081807, 4 pages.
Notice of Final Rejection dated Jul. 12, 2011 in related Japanese patent application No. 2005-081807, 7 pages.
European Communication Pursuant to Article 94 for Application No. 05102220 dated May 31, 2012 and European Communication Pursuant to Article 94 for Application No. 05102220 dated Jan. 23, 2008, 10 pages.
Notice of Allowance dated Jan. 30, 2012 in related Korean patent application No. 10-2005-0023512, No Translation Available, 2 pages.
Letters Patent from related Chinese patent appln. No. 200510065645. 4, dated Jun. 22, 2011, 4 pages.
Letters Patent from related Korean patent appln. No. 10-2005-0023512, dated Apr. 9, 2012, 3 pages.

* cited by examiner

METADATA DRIVEN CUSTOMIZATION OF A COMPUTER APPLICATION

CROSS-REFERENCE TO RELATED APPLICATION

The present application is a continuation of and claims priority of U.S. patent application Ser. No. 12/984,686, filed Jan. 5, 2011, which is based on and claims the benefit of U.S. patent application Ser. No. 10/760,099, filed Jan. 16, 2004, now U.S. Pat. No. 7,890,544, issued Feb. 15, 2011. The contents of these applications are hereby incorporated by reference in their entirety.

BACKGROUND

The present disclosure generally relates to customization of a software-implemented business process and, more particularly, to a method of customizing a software-implemented business process on a mobile computing device without having to modify the source code.

One approach to designing and marketing computer software-related products is to focus on horizontal functionality such that the product is broadly applicable across large industry segments, and across many different countries. Such a system may also desirably promote an aftermarket to meet the unique needs of specific vertical target markets and specific companies. Similarly, the product may desirably promote a customer's ability to change or customize the product to their individual needs.

If the product cannot be extended to meet the unique needs of a customer, it essentially requires a customer to change its business to match the software which the customer has just purchased. Of course, these types of systems are resisted by customers, since changes to business activities can be costly and time consuming.

There are a number of different techniques which have been conventionally used in order to enable a system to be customized. Such conventional techniques include, for example, source code modification. This technique entails providing customers with copies of the source code for the product. It thus allows a well trained practitioner to change significant amounts of content, and those changes can be made to look as if they are part of the product, because in effect, they are part of the modified source code product.

However, source code modification carries with it significant drawbacks. For example, source code modification costs a significant amount of money prior to using the product, because the user or customer must often hire expensive consultants and developers who have been specifically trained in the nuances of how the product is built. The user must then endure the risk of estimating a problem, which is a very difficult and imprecise task. Even if these problems can be overcome and persevered, the result is modified source code. When the manufacturer of the original source code ships additional software, such as bug fixes, updates, and new versions, the customer is either forced to again hire talented engineers or developers (and hopefully the same ones who made the original modifications), in order to merge those modifications into the new source code shipped by the manufacturer, and to resolve issues, one-by-one, as they arise in the newly modified source code. Alternatively, the user can simply go without the bug fixes and new features that may benefit the user's business.

In addition, source code modification makes it extremely difficult to simply purchase add-on modules "off the shelf" from multiple different vendors, because each of those vendors will likely have to modify the source code as well to accommodate their specific off the shelf modules. Consequently, not only must the manufacturer ship the source code of the base product, but each add-on vendor must ship their source as well. The user must then conduct some sort of adhoc merge process or synthesize a single product out of these random sets of source code. Of course, this results in a brittle set of code that is virtually guaranteed to have problems with upgrades or when any one of the vendors ships a bug fix.

Source code modification also suffers from the problem that only one organization in the world (the specific developers or engineers who modified the source code) knows how the modified source code product was built. Therefore, it is difficult, if not impossible, to achieve economies of scale and product support for any of the products running at the customer site.

The problems with source code modification increase significantly when, even within a single customer, there exists a diverse set of users with a diverse set of needs and preferences. Every time one of those users changes the product through the source code modification strategy in order to accommodate their particular needs, the customer employing those users, in effect, ends up with a new source code base. In other words, the customer does not only have a single custom code base, but it may actually have many custom code bases, depending upon how many specific users or departments within the customer have modified the code base. Again, each time a bug fix is published or a change is made to a customization that applies to all users, the customer must go through some sort of merge process with all other copies of the source which have been made.

This is only a partial list of the many problems associated with source code modification techniques. These problems can result in a great deal of difficulty for the management of the customer, and the employees themselves.

Another technique which enables some limited modification of a computer program that is based on objects includes the addition of user fields which can be defined by the user. In other words, each object which is to be "customizable" is initially defined to have one or more user fields which can be defined or used by the user, as the user wishes. While this does allow some type of customization, it does not solve all the problems mentioned above. It also carries with it a large number of its own problems. For example, the naming convention associated with the user fields makes it non-intuitive and difficult to associate the specific uses of those user fields. For instances, the additional user fields are typically named with very general names such as "USERFIELD.1" to "USERFIELD.N." It is difficult, if not impossible, for the users to remember what each user field has been used for. In addition, the additional user fields do not solve problems associated with multi-vendors or multiple modifications by different organizations. For example, if one vendor or one user assigns the user fields in a first way, but another vendor or user assigns the same user fields in a different way, then there is inconsistency in how the user fields are defined, and the two products associated with the two vendors or users will not work together without even further modification.

Other techniques for customizing have been tried as well. For example, customizations can be made by writing custom event code. Then, by using a one-to-one mapping to the original objection in the source code, the "customized" object can be manipulated when an event occurs on the original object. Another technique previously used is to include "property bags" or name-value pairs. Both of these techniques also have significant drawbacks and do not remedy the deficiencies associated with source code modification.

It is becoming more common for some business applications, such as customer relationship management applications, to be implemented in mobile computing devices. Such mobile computing devices include personal digital assistants (PDA's), mobile phones, and other mobile computing devices. User's of such systems generally update a database on the mobile computing device through a synching operation with a central database of a server thereby making the data, such as account information, accessible by the user of the mobile computing device. Unfortunately, limitations in the memory capacity of mobile computing devices make it undesirable to perform full uploads of the data contained in the central database, which can be time-consuming as well.

SUMMARY

Embodiments of a method of facilitating customization of a software-implemented business process are disclosed. In one embodiment, a subscription list of entities is stored within a mobile computing device. The subscription list being defined by subscription metadata. Customized data is received. The customized data corresponds to the entities identified in the subscription list. The received customized metadata is stored on the mobile computing device.

DETAILED DESCRIPTION OF ILLUSTRATIVE EMBODIMENTS

The present invention generally relates to customization of a software-implemented business process or application. However, prior to discussing the present invention in greater detail, one embodiment of an illustrative environment in which the present invention can be used will be discussed.

Figure 1:
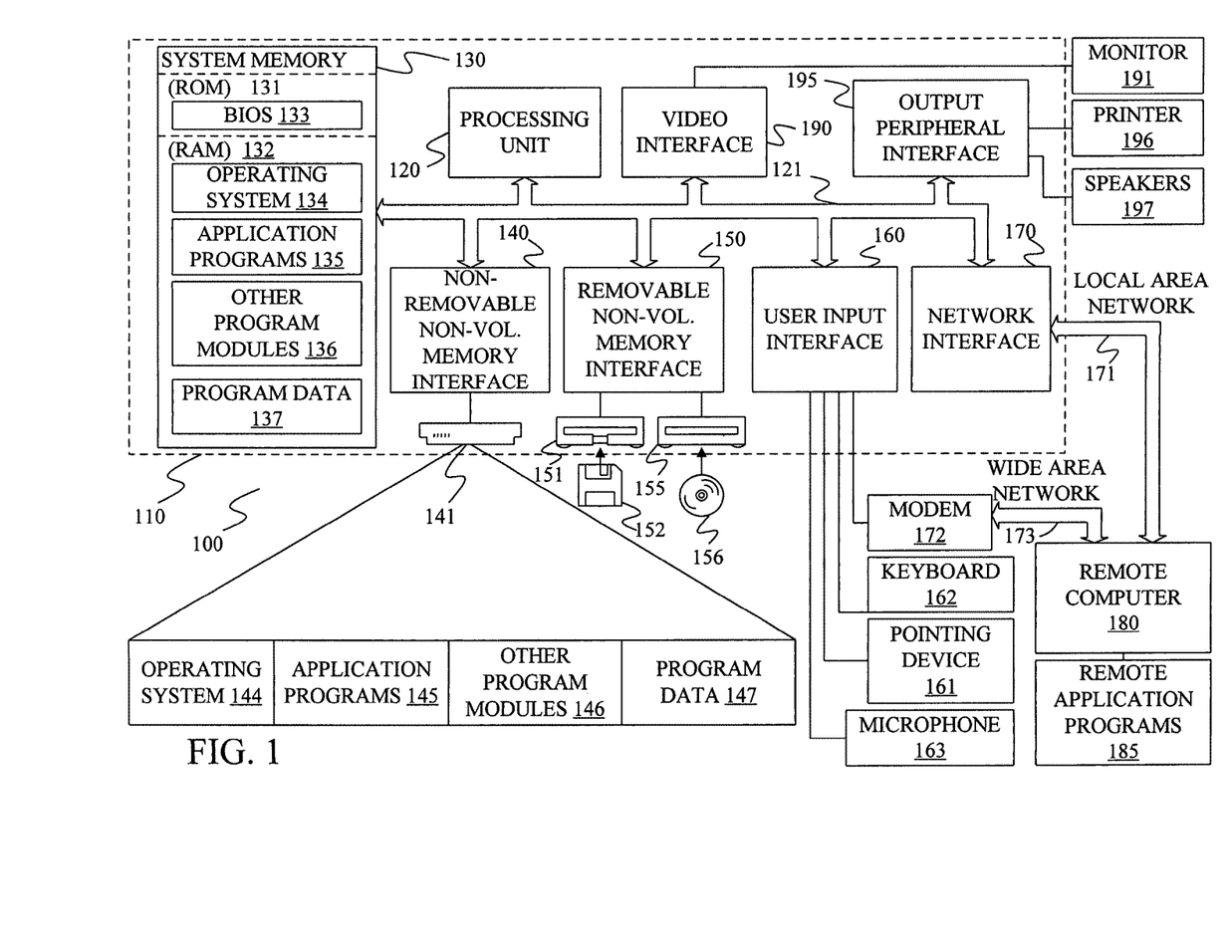
FIG. 1 is a block diagram of an environment in which the present invention can be used.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

One aspect of the method and system of the present invention is generally directed to customizing a software-implemented business process or application that utilizes an object-relational (or entity-relational) data storage system. Such customization is desirable to allow for affordable business applications to be produced that are specific enough to increase business productivity while, at the same time, are general enough to attract a wide customer base.

The method and system of the present invention are particularly useful when used to provide entity customization and filtering for customer relationship management (CRM) applications on mobile computing devices. Such applications are configured to help businesses build profitable customer relationships by allowing, for example, sales and service employees to share information, such as sales leads, customer history, and searchable knowledgebases. For example, a car salesperson may be interested in the mileage of a customer's car, whereas an insurance salesperson would rather know about a customer's age and health history. The present invention provides the tools that are necessary to customize the application to suit the needs of car and insurance salespeople, farmers, and other salespeople.

Figure 2:
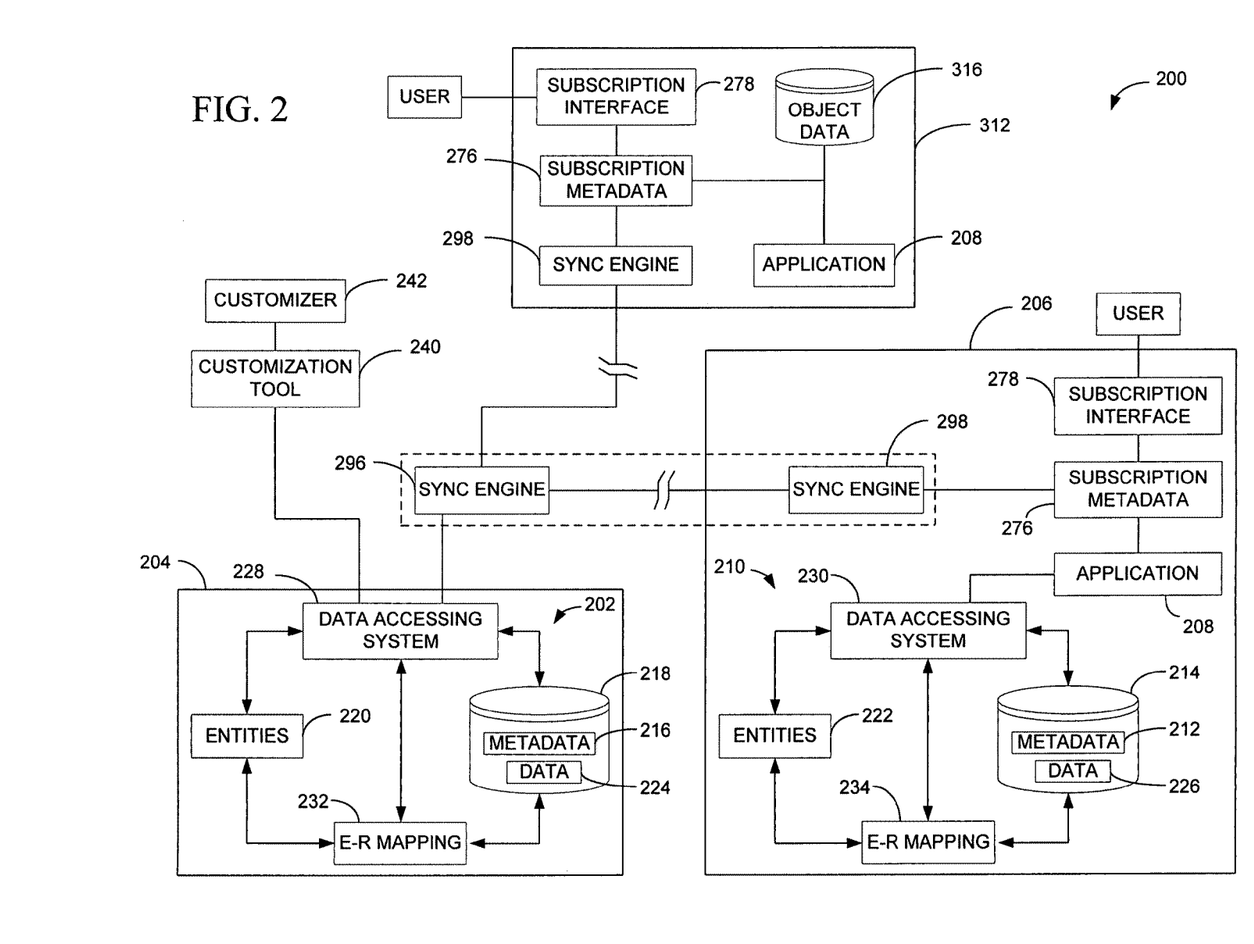
FIG. 2 is a block diagram of an example of a system configured to customize a computer-implemented business process, in accordance with embodiments of the invention.

FIG. 2 is a schematic diagram of an example of a system, designated as 200, in accordance with embodiments of the present invention. System 200 generally includes a central data storage system 202 on server 204 and one or more mobile computing devices 206, each of which include a business application 208 and a mobile data storage system 210.

In accordance with one aspect of the present invention, application 208 is driven by metadata 212 contained in mobile relational database or data store 214, which, in accordance with one embodiment of the invention, is a subset of customized metadata 216 contained in relational database or data store 218 of central data storage system 202. The metadata (212 and 216) generally define the elements of the data structures of the systems 202 and 210 and control how the application 208 operates and displays itself. This allows the applications 208 on mobile computing devices 206 to be customized, through customization of the metadata 212, to meet the needs of a vertical industry without requiring modification to the underlying code of the applications 208.

One advantage to this approach is that the metadata driven applications 208 on mobile computing devices 206 can be customized by an administrator who does understanding how to code using, for example, graphical user interface tools. Additionally, customizations can be easily deployed onto the server 204 as customized metadata 216 and onto the mobile computing devices 206 (e.g., personal digital assistants (PDA's), mobile phones, etc.) as mobile metadata 212 without recompiling the code for application 208. Furthermore, the applications 208 can be updated through installation of service packs without losing any of the customizations that have been made. As a result, the applications 208 can easily evolve along with the needs of a business without requiring the intervention of the developer of the business application.

The data storage systems 202 and 210 are preferably entity-relational (E-R) storage systems. However, it should be noted that the present invention can be used with other types of data storage systems and, therefore, is not limited to E-R systems. The data storage systems 202 and 210 respectively include a set of entities (or objects) 220 and 222, which correspond to relational data 224 and 226 stored in the corresponding database or data stores 218 and 214. Data storage systems 202 and 210 also include data accessing systems 228 and 230, which respectively provide access to the relational data 224 and 226 by matching the data to the entities 220 and 222 using entity-relational (E-R) maps 232 and 234. E-R maps 232 and 234 respectively contain mappings between the entities 220 and 222 and the table entries of data 224 and 226 in the corresponding databases 218 and 214. Data storage systems 202 and 210 can include additional maps, such as a map defining relationships between individual entities 220 and 222.

Entities 220 and 222 of data storage systems 202 and 210 can be rendered in accordance with metadata 216 and 212. Accordingly, the metadata 216 and 212 can comprise individual metadata entities, each of which define one of the entities 220 and 222 of the systems 202 and 210.

As mentioned above, the customized metadata 216 of central system 202 on server 204 is preferably customizable by the administrator or customizer of system 200 and a subset of the customized metadata 216 is provided to the system 210 of the mobile computing device 206 and stored as metadata 212. Preferably, metadata 212 of mobile computing device 206 defining entities 222 is preferably not customizable by the user of the mobile computing device 206. As a result, the customized metadata 216 also operates to customize the business application 208 of the mobile computing device 206, as will be discussed below in greater detail.

The metadata 216 and 212 define basic classes of content for the entities 220 and 222 including data content and user interface content. The data content represents information that the system stores. For example, the data content may include customers, inventor items, orders, etc., each of which is defined by a data field. User interface content includes content that a user sees on a screen or report. It may contain such things as layout information, messages, data field labels, etc. These types of contents, as well as other types, can be customized in accordance with various embodiments of the present invention.

Metadata 216 are customized using customization tool 240 based upon input 242 from an administrator or customizer of system 200. Customization tool 240 generally provides a graphical user interface that assists the customizer 242 through the process of customizing metadata 216. Initially, each new metadata entity may consist of a base metadata entity that contains default data and user interface content settings. The user interface of the customization tool 240 preferably allows the customizer to add, delete, and modify the data and user interface content of the base metadata entity. Once the customized metadata 216 is provided by the customizer, it will be used to customize the application 208 of the mobile computing device 206. When the application 208 is updated or a new software package is installed on mobile computing device 206, the customizations are installed and applied automatically without user intervention.

Figure 3:
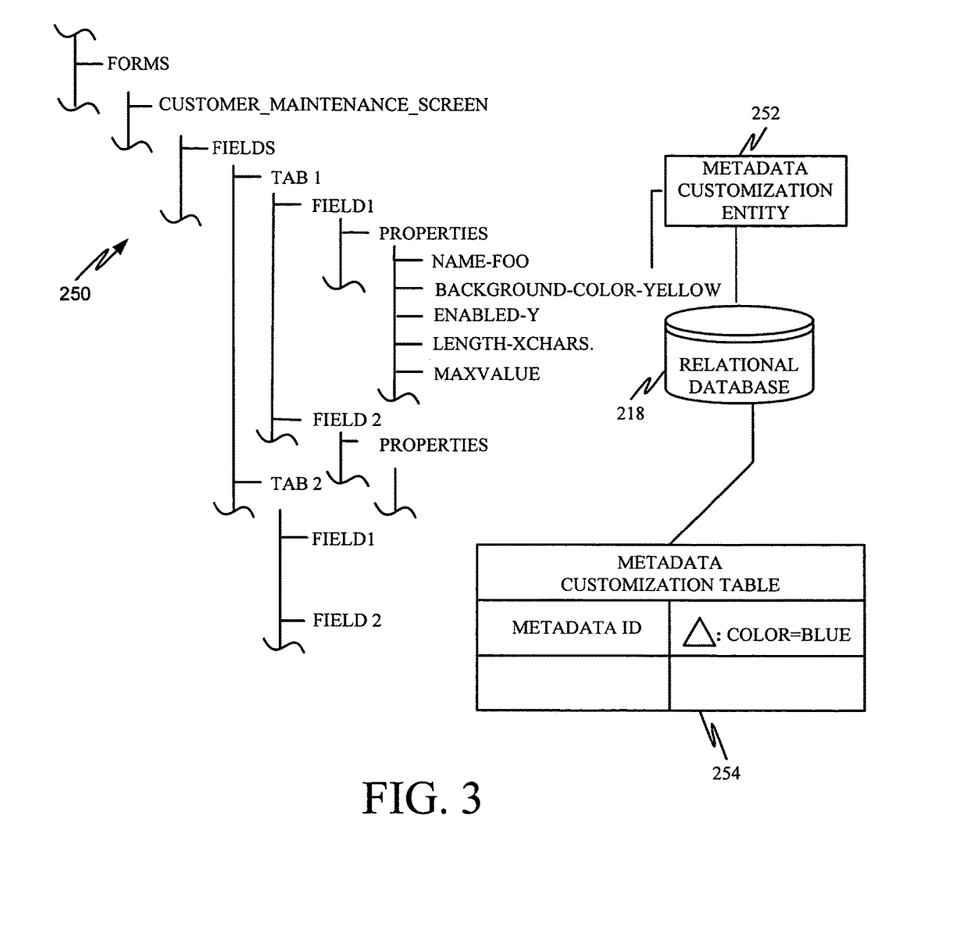
FIG. 3 illustrates an embodiment of a metadata structure and customizations in accordance with embodiments of the present invention.

FIG. 3 illustrates a metadata structure and metadata customization in accordance with embodiments of the invention. The metadata structure is illustrated by a portion of a metadata structure tree 250. It will be appreciated that the portion of tree 250 shown in FIG. 3 is illustratively but a very small portion of a much larger tree that defines customized metadata 216 for system 200. Portions of the metadata structure tree define metadata entities, such as metadata entity 252, which correspond to entities 220 in data storage system 202.

The portion of metadata structure tree 250 shown in FIG. 3 illustrates that the metadata includes a Form section (user interface content) which itself includes a Customer_Maintenance_Screen. The Customer_Maintenance_Screen includes fields (data content) which have a plurality of Tab controls. Tab control 1 has a Field 1 associated with it. Field 1 has a plurality of properties, including the field name, the background color for the field, whether the field is enabled or disabled, the length of the field, and the data type for the field (which in this case is Max Value). Of course, the field can have a plurality of additional properties as well.

In order to customize a metadata structure 250, the customizer 242 inputs the customization specification through customization tool 240. Customization of the metadata 216 can be achieved through direct input of the setting, or an addition of a node. For example, the background color for the field having a name "foo" is yellow in metadata structure 250. Assume that a customizer wishes to change the background color to blue. In that case, the customizer makes the change by directly inputting the color change to blue through the graphical user interface provided by the customization tool 240.

Alternatively, customization of metadata 216 can be achieved by using deltas. A delta represents a change in the metadata structure 250 from its original form. A customization can contain any number, n, of deltas, each delta representing a specific change relative to a known instance of a base structure. Further, the delta need not simply represent a change to an existing node, but can represent the addition of a new node in the metadata structure 250.

For example, in order to make the change described above with respect to the field named "foo", the customizer will make a single customization containing a single delta. The customization is relative to the field "foo" under Tab 1 of the Customer_Maintenance_Screen. The customization can be stored in a separate part of the metadata store (database or data store 218) or in a metadata customization entity 252 which is mapped to the relational database 218. A metadata customization table 254 in relational database 218 contains a metadata ID identifying the background color property of field 1 under tab 1 of the fields in the Customer_Maintenance_Screen portion of the Forms. Table 254 also includes delta information which identifies the delta, that being that the background color of the field is changed to blue. Thus, the delta is not a copy of the source that has been modified. Instead, it is only a specification of which value in structure 250 should be modified. By only tracking deltas, it is possible for many modifications to be dynamically applied to a target entity.

Figure 4:
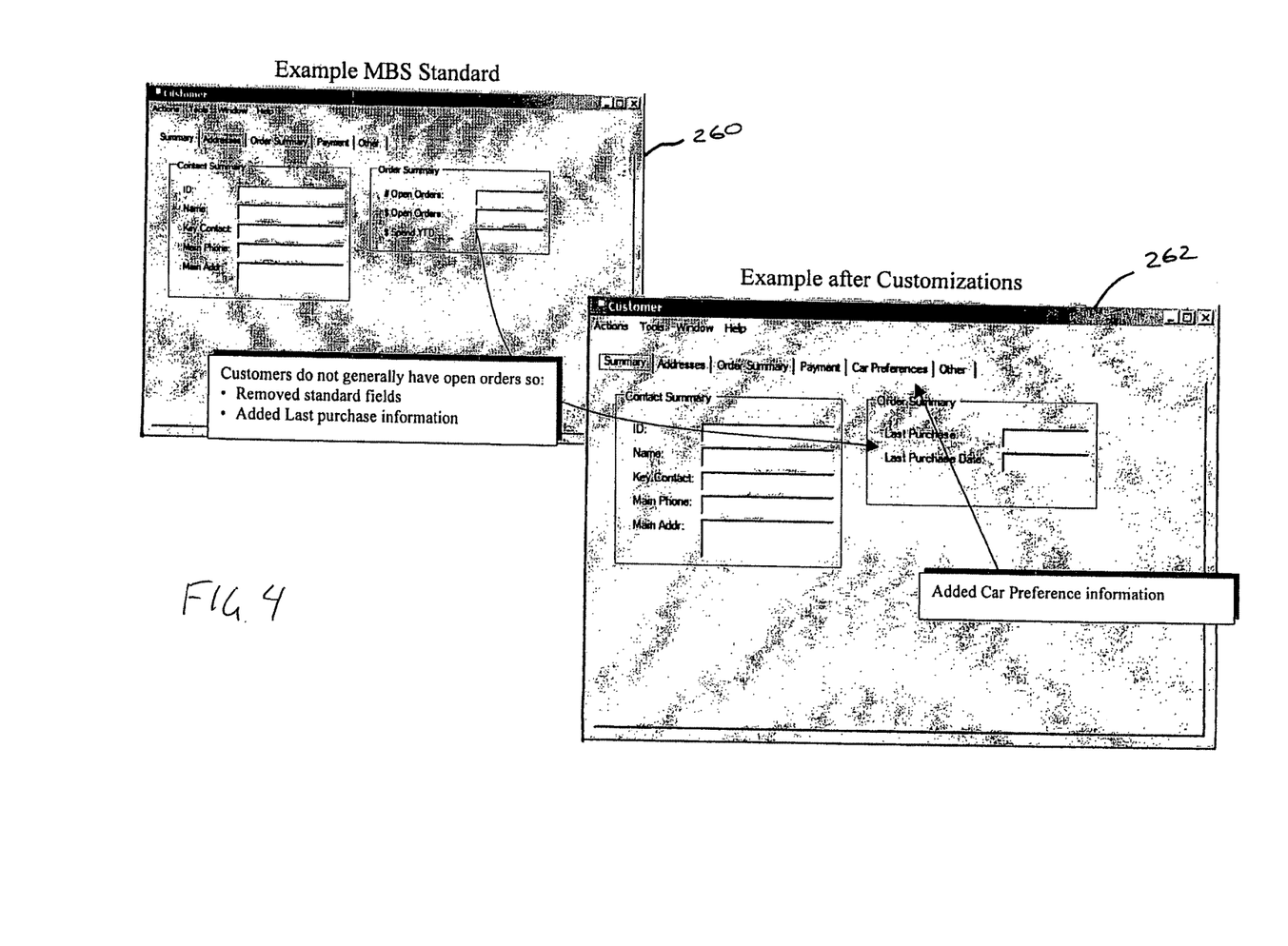
FIGS. 4-6 are screen shots illustrating an example of a customization of a system screen in accordance with embodiments of the present invention.
Figure 5:
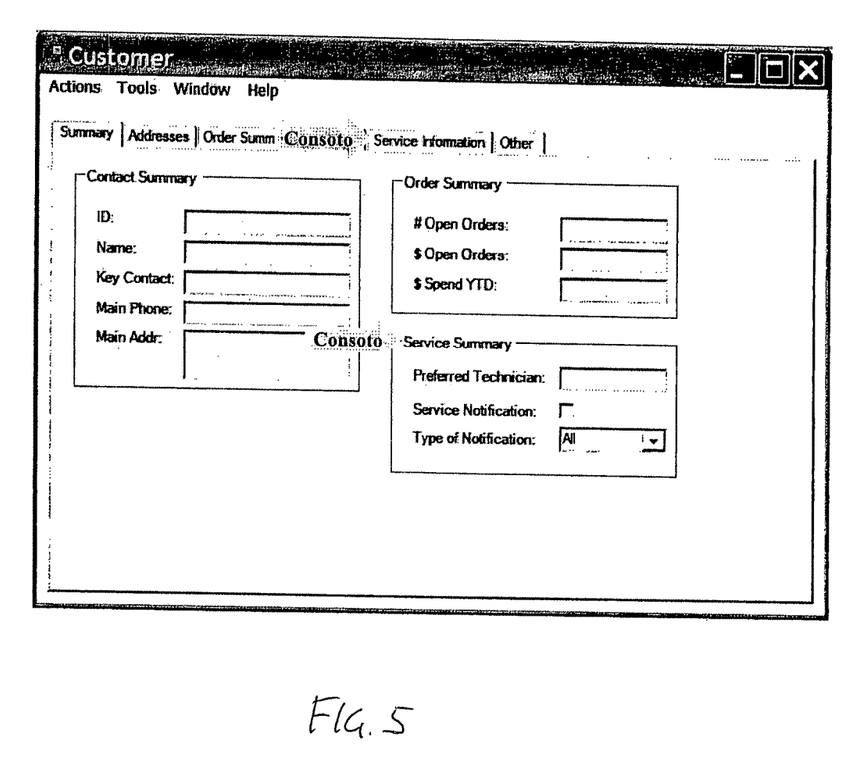
Figure 6:
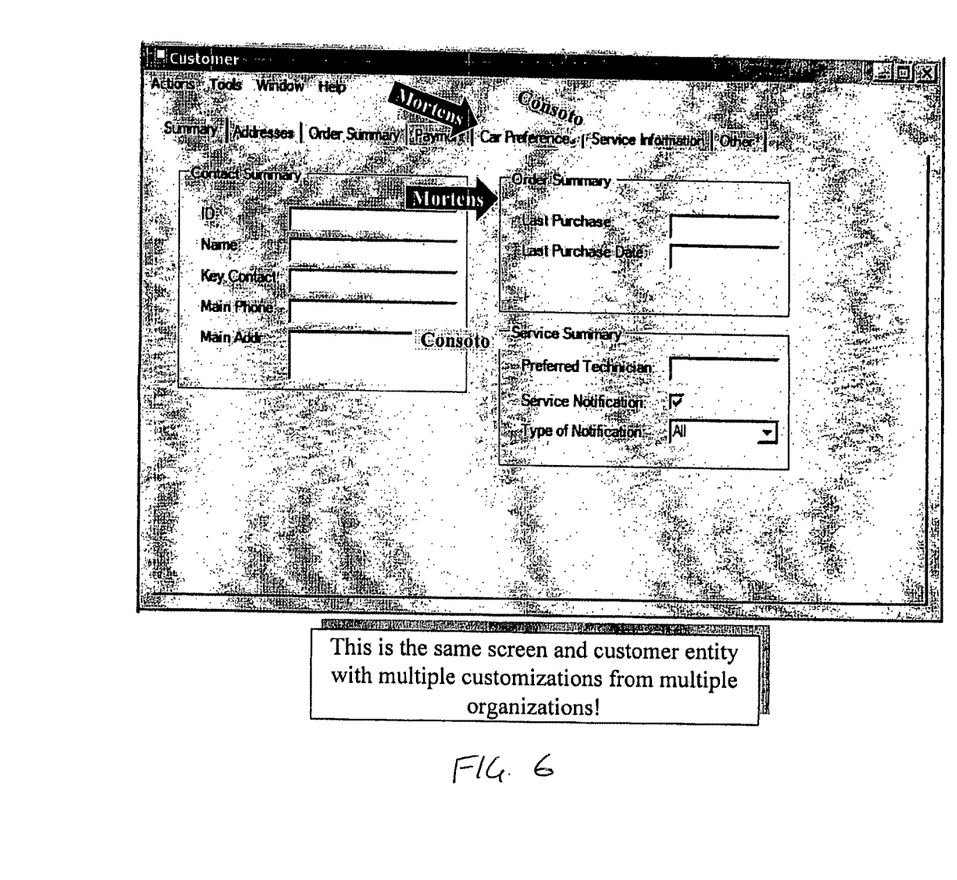

FIGS. 4-6 illustrate an example of a customization of application 208 through metadata customization. In the example illustrated in FIGS. 4-6 assume that a car dealership Mortens Autos purchases a financial software package. After installation and running of the application package, Mortens Autos customizes the product to add fields (data content) to track each customer car preferences (such as color, engine, make/model, etc.). Assume that Mortens Autos also adds new fields to a customer screen for the customer car preferences, and removes a number of unused fields.

FIG. 4 illustrates a screen shot 260 of a default customer screen displayed by the financial package purchased by Mortens Autos that has been generated in accordance with a default or base metadata entity. It can be seen that screen 260 includes order summary fields which are not generally used in the car dealer industry. FIG. 4 also shows the same customer screen 262 after customizations to the metadata entity have been implemented. The original order summary fields have been replaced with fields indicating the customer's last purchase and last purchase date. In addition, a car preferences tab has been added to display the customer's car preferences. This is all accomplished simply by customizing the associated metadata 216 using the customization tool 240 of system 200, as discussed above.

Next, assume that another business solutions provider, Consoto, introduces electronic mail notifications for service reminders. Assume further that the customer entity provided by Consoto also adds a string to the customer entity for the name of the customer's favorite technician and a text box for a new field to the customer screen. An example of Consoto's customer screen is illustrated in FIG. 5. Assume that Mortens Autos buys, from Consoto, a software package to run the service department.

After the installation, all previous customizations still work without manual intervention or rework. This is shown in FIG. 6. For instance, the customer's car preferences field is shown on the screen and the original Order fields are removed from the screen. Similarly, Consoto's changes to the customer screen are also provided. Specifically, the new fields on the customer entity and text boxes on the customer screen are included. As is described above, when the new software package is installed, the customizations take effect without automatically, without user intervention.

Another aspect of the present invention allows for users of the business application 208 on remote or mobile computing devices 206 to control which customized metadata entities will be rendered thereon. This allows the user to avoid loading large amounts of unnecessary data to the mobile computing device 206, which generally has a limited data storage capacity as compared to non-mobile computing devices, such as desktop computers. Additionally, this aspect of the present invention allows the user to select only those entities that are relevant to his or her business practice. Such filtering of the customized metadata allows the user to operate the application more efficiently by avoiding having to sort through a large number of entities, which the user is not associated with.

A method of customizing a software implemented business process or application in accordance with the above-described aspects of the present invention will be discussed with reference to the flowchart of FIG. 7. At step 270 of the method, customized metadata 216 defining entities 220 (FIG. 2) is provided. This step is preferably performed as described above using customization tool 240. The customized metadata 216 and data 224 corresponding to the entities 220 are then stored in a first data store 218 of system 202, at step 272.

Next, at step 274, a subscription list of the customized metadata entities 216 is provided on the mobile computing device 206. The subscription list is defined by subscription metadata 276 stored in a subscription data store of mobile computing device 206, as shown in FIG. 2. The subscription list or metadata 276 identifies a subset of the customized metadata entities 216 contained in data store 218 of data storage system 202.

Figure 8A:
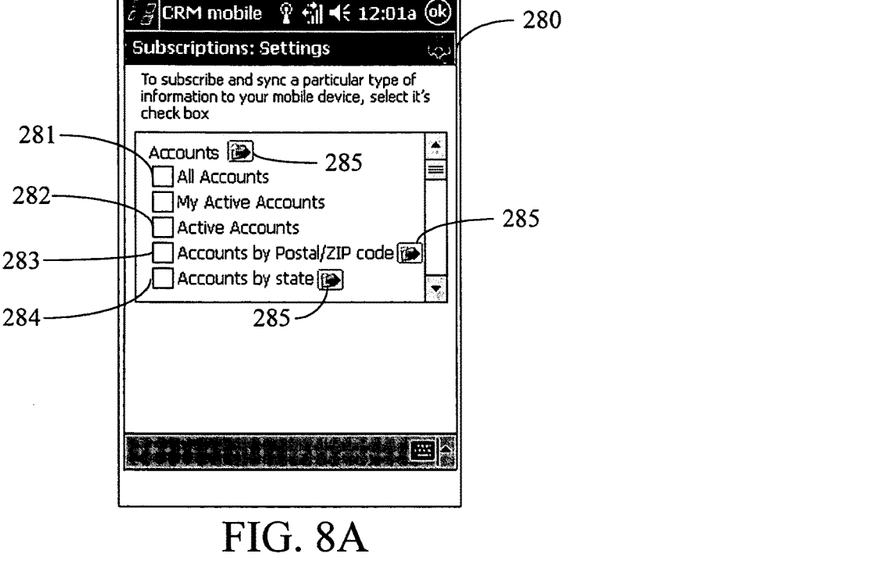
FIGS. 8A-8B are examples of graphical user interfaces in accordance with embodiments of the invention.

The subscription metadata 276 is preferably generated by the user through a subscription interface 278 shown in FIG. 2. Subscription interface 278 preferably includes a graphical user interface. In accordance with one embodiment of the invention, the graphical user interface provides a list of the customized entities 216 by name that can be selected by the user for inclusion in the subscription list 276. The graphical user interface preferably organizes the customized metadata entities 216 for presentation to the user or provides options to the user as to how the subscriptions to the customized metadata entities are to be presented. An exemplary graphical user interface 280 is shown in FIG. 8A, which provides the user options of displaying all of the subscriptions or accounts by selecting check box 281, only the active accounts by selecting check box 282, accounts by Postal/ZIP code by selecting check box 283, or the accounts organized by state by selecting check box 284, for example. The user can also designate the particular accounts that will comprise the main list of customized metadata entities 216 or accounts from which the subscriptions are made, and the particular states or Postal/ZIP codes that are to be used to organize the main list of accounts by selecting, for example, the corresponding arrow icon 285.

Figure 8B:
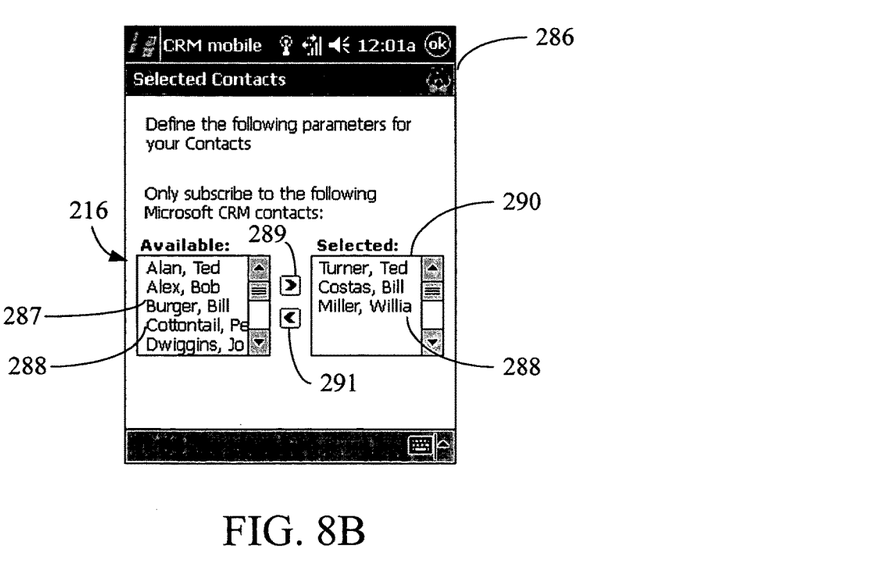

Once a selection of the desired list of customized metadata entities 216 is made by the user of mobile computing device 206, the customized metadata entities 216 or accounts are presented accordingly. FIG. 8B is an example of a graphical user interface 286 presenting a list 287 of customized metadata entities 216 or accounts in accordance with the user's selection from the options presented in the graphical user interface 280 shown in FIG. 8A. The user can select individual customized metadata entities 288 or accounts from the presented list 287 in accordance with conventional methods. In the present example, the user selects individual customized metadata entities 288 or accounts for subscription by highlighting an individual entity 288 and selecting arrow 289 to add the entity 288 to a subscription list 290. Individual entities 288 can be deselected from the subscription list 290 in a similar manner by highlighting the particular entity 288 and selecting arrow 291 to remove it from the list 290.

The graphical user interface 280 can also provide the user with information as to an estimated amount of memory storage that remains available to the mobile computing device 206 after a synch is performed to load the entities 216 of the subscription list 290 into the device 206.

It should be understood that many other types of graphical user interfaces can be generated by subscription interface 278 to provide the user with a means for selecting the desired customized metadata entities 216, such as drop-down menus and other suitable interfaces. Once the user makes the selection of the customized entities to be included in the subscription list 290, the subscription metadata 276 that defines the subscription list 290 is generated and stored in a subscription data store.

Figure 7:
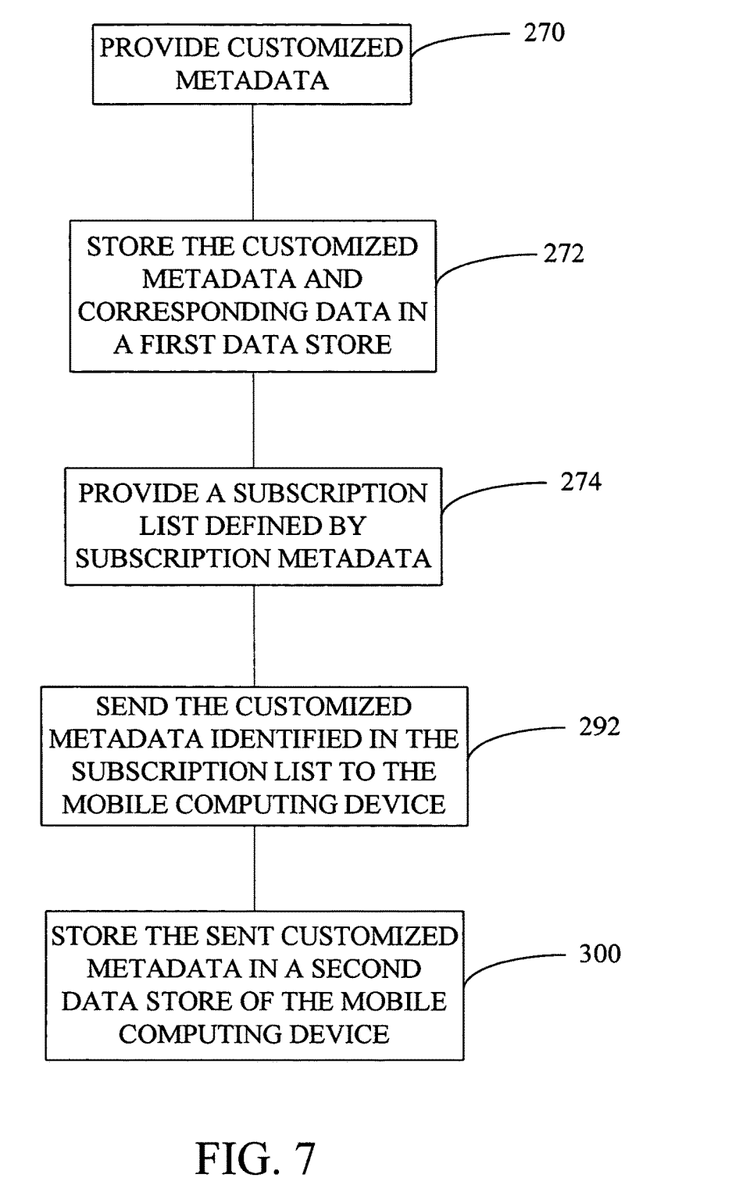
FIG. 7 is a flowchart illustrating a method of customizing a software-implemented business process in accordance with an embodiment of the invention.

At step 292 of the method of FIG. 7, the customized metadata or entities 216 corresponding to the entities 282 identified in the subscription list 276 are sent to the mobile computing device 206. In accordance with one embodiment of the invention, this data transmission is performed using synchronizer 294, shown in FIG. 2. Synchronizer 294 includes sync engines 296 and 298, which are configured to form a communication link between central and mobile data storage systems 202 and 210 and allow system 200 perform a sync operation between central and mobile databases 218 and 214 in accordance with known methods. Such sync operations are preferably substantially performed in the background to allow the user of the mobile computing device 206 to access and operate the application 208 without interruption.

During a sync operation between the central and mobile data storage systems 202 and 210, the subscription metadata 276 is read to determine which customized metadata entities 216 are to be sent to the mobile computing device 206. Next, only the customized metadata entities 282 identified in the subscription list 276 are sent to mobile computing device 206, which are then stored in data store 214, as indicated at step 300 of the method. Alternatively, when mobile computing device 206 already includes customized metadata 212 in data store 214, the synch operation between the central and mobile databases 218 and 214 can simply involve replacing the existing or old customized metadata with the new customized metadata. Preferably, only the customized metadata 216 contained in central data store that has been updated since the last synching operation is sent to the mobile computing device 206 to either replace the corresponding old customized metadata 212 or be added to the metadata 212.

Preferably, the data 224 that corresponds to the customized metadata entities 282 identified in the subscription metadata 276 are also transmitted to mobile computing device 206 and stored in data store 214 by data accessing system 230. The application 208 then renders or populates the entities defined by the customized metadata entities 212 using the corresponding sent data 226 contained in data store 214. The populated or rendered entities 222 can then be displayed for the user on the mobile computing device 206 in accordance with the form or view defined by the corresponding sent customized metadata 212.

Figure 9:
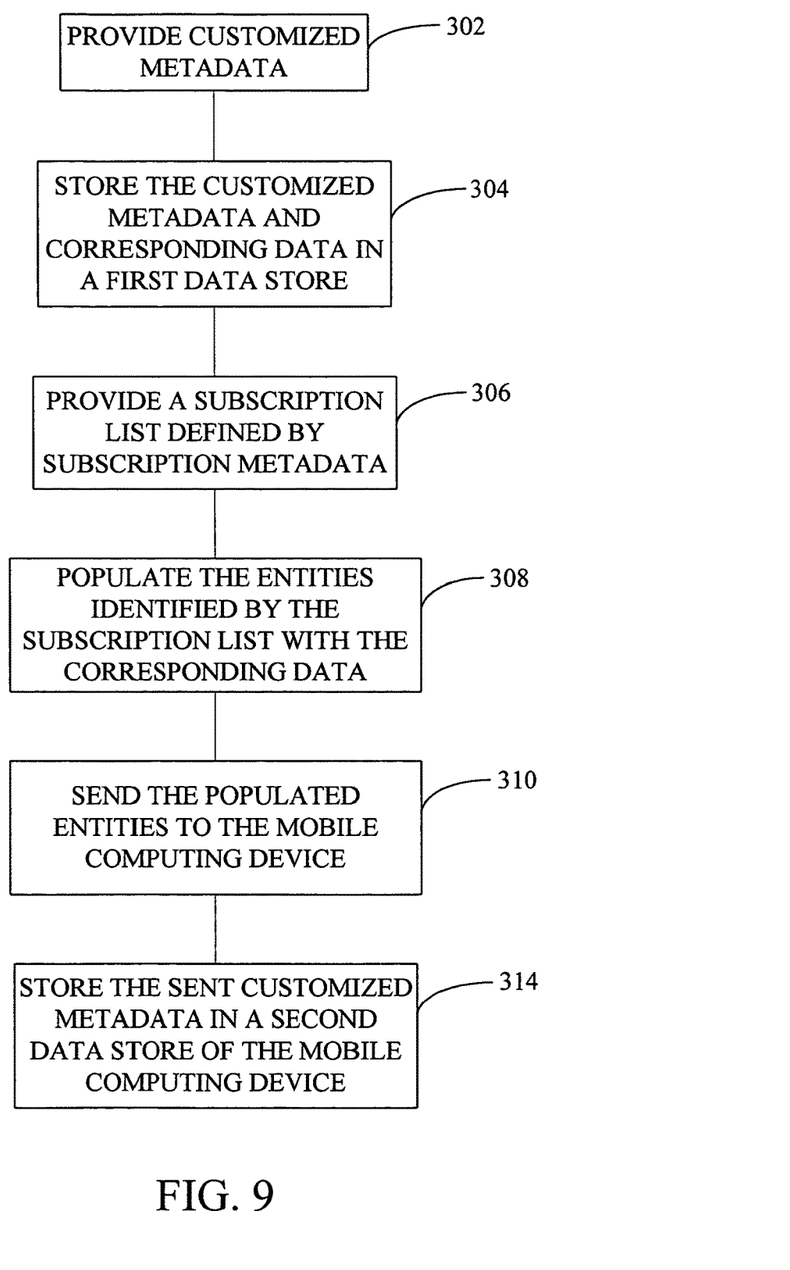
FIG. 9 is a flowchart illustrating method of customizing a software-implemented business process in accordance with an embodiment of the invention.

One alternative to transmitting the customized metadata 216 and the corresponding data 224 separately to mobile computing device 206 is to transmit rendered or populated entities 220 that correspond to the customized entities 282 identified in the subscription list 276. This embodiment of the method of the present invention is illustrated in the flowchart of FIG. 9. The method initially begins in accordance with steps 270, 272, and 274 of the method discussed above. Accordingly, customized metadata 216 is provided at step 302, the customized metadata and corresponding data are stored at step 304, and a subscription list of the entities defined by subscription metadata is provided at step 306. However, rather then sending the customized metadata 216 and the corresponding data 224 separately to database 214 of mobile computing device 206, the entities 282 identified in the subscription list 276 are rendered or populated, at step 308, with the corresponding data 224 in accordance with the customized metadata 216 to form populated entities or objects. Next, at step 310, the populated entities are sent to the mobile computing device 312 (FIG. 2). Finally, at step 314, the populated entities are stored in an object data store 316 of the mobile computing device 312, as illustrated in FIG. 2. Preferably, only the populated entities that have changed since the last synching operation are sent to mobile computing device 312 to replace old populated entities contained in the object data store 316 or to be added thereto. As a result, there is no need to render the entities defined by the customized metadata 216 in the mobile computing device 312. Instead, application 208 of mobile computing device 312 can directly access the populated entities and display them to the user.

Although the present invention has been described with reference to particular embodiments, workers skilled in the art will recognize that changes may be made in form and detail without departing from the spirit and scope of the invention.

What is claimed is:

1. A computer-implemented method performed by a client computing device, the method comprising:
   receiving an indication of a data object selection input associated with a client application;
   based on the indication of the data object selection input, selecting a subset of data objects, the subset comprising some, but not all, of a set of data objects associated with a remote server computing system that is remote from the client computing device;
   generating a subscription list that identifies the selected subset;
   transmitting an indication of the subscription list to the remote server computing system;
   receiving, from the remote server computing system, generated customized metadata that:
   is based on the subscription list, and
   represents a change in a metadata structure that defines a customization to the subset of data objects;
   generating a user interface display that is associated with the client application and utilizes a customized layout, defined by the received customized metadata, to replace a first layout associated with the user interface display; and
   generating a rendering instruction to render the user interface display on the client computing device.

2. The computer-implemented method of claim 1, wherein the customized metadata includes a metadata delta that represents a change in a metadata structure that defines the user interface display.

3. The computer-implemented method of claim 2, wherein the metadata structure defines user interface content.

4. The computer-implemented method of claim 3, wherein the metadata delta identifies a change in a metadata value from a default value.

5. The computer-implemented method of claim 3, wherein the customized metadata includes a plurality of metadata deltas, each metadata delta representing a specific change to a portion of the user interface content.

6. The computer-implemented method of claim 3, wherein the metadata delta represents an addition of a new node in the metadata structure.

7. The computer-implemented method of claim 3, wherein the metadata structure and the changed metadata structure are stored separately in a metadata store associated with the client computing device.

8. The computer-implemented method of claim 1, the method comprising:

generating a representation of a subscription user interface that includes a data object selection user input mechanism;

receiving the indication of the data object selection input through the data object selection user input mechanism;

storing the subscription list within a data store of the client computing device; and utilizing the customized layout to replace a default layout.

9. The computer-implemented method of claim 8, wherein the customized metadata corresponds to the data objects identified in the subscription list, and identifies at least one of:

a field that is removed from the user interface display; and a field that is added to the user interface display.

10. The computer-implemented method of claim 1, wherein the subscription list is transmitted from the client computing device and the customized metadata is received as a response to said transmission of the subscription list.

11. The computer-implemented method of claim 1, wherein the subscription list is transmitted over a network, from the client computing device to a synchronizer.

12. The computer-implemented method of claim 11, wherein the customized metadata is received, over the network, by the client computing device from the synchronizer.

13. The computer-implemented method of claim 1, wherein the customized metadata includes metadata corresponding to orders.

14. The computer-implemented method of claim 1, wherein the application is associated with an enterprise resource management application.

15. A client computing device comprising:

a communication interface configured to communicate with a remote server computing system, that is remote from the client computing device, over a communication network;

one or more processors; and memory storing instructions which, when executed by the one or more processors, configure the client computing device to:

receive an indication of a data object selection input associated with a client application;

based on the indication of the data object selection input, select a subset of data objects, the subset comprising some, but not all, of a set of data objects associated with a remote server computing system that is remote from the client computing device;

generate a subscription list that identifies the selected subset;

transmit, by the client computing device to the remote server computing system over the communication network, an indication of the subscription list;

receive, by the client computing device from the remote server computing system, generated customized metadata that:

is based on the subscription list, and defines a customization to the subset of data objects;

generate, by the client computing system, a user interface that is associated with the client application and utilizes a customized layout, defined by the received customized metadata, to replace a first layout associated with the user interface; and generate a rendering instruction to render the user interface.

16. The client computing device of claim 15, wherein the customized metadata includes a metadata delta that represents a change in a metadata structure that defines the user interface.

17. The client computing device of claim 16, wherein the metadata structure defines user interface content and the metadata delta identifies a change in a metadata value from a default value.

18. The client computing device of claim 15, wherein the instructions configure the client computing device to:

transmit the subscription list over a network to a synchronizer; and receive the customized metadata over the network from the synchronizer.

19. A computer-implemented method performed by a computing system comprising:

receiving a subscription list from a client computing device that is remote from the computing system over a communication network, the subscription list identifying a subset of data objects, the subset comprising some, but not all, of a set of data objects that are defined by a metadata structure stored in association with the computing system;

generating customized metadata that:

corresponds to the subset of data objects in the subscription list, and represents a change to the metadata structure that defines a customization to the subset of data objects; and transmitting, to the client computing device, the generated customized metadata that represents a change, to a user interface display associated with a client application on the client computing device, that replaces a first layout associated with the user interface display with a customized layout.

20. The computer-implemented method of claim 19, wherein the generated customized metadata comprising a first metadata delta that identifies a change in a metadata value from a default value and a second metadata delta that identifies an addition of a new node in the metadata structure.

* * * * *